United States Patent
Ma

(10) Patent No.: US 11,206,218 B2
(45) Date of Patent: *Dec. 21, 2021

(54) PACKET FLOW CLASSIFICATION IN SPINE-LEAF NETWORKS USING MACHINE LEARNING BASED OVERLAY DISTRIBUTED DECISION TREES

(71) Applicant: Cisco Technology, Inc., San Jose, CA (US)

(72) Inventor: Xueqiang (Sherman) Ma, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/859,888

(22) Filed: Apr. 27, 2020

(65) Prior Publication Data

US 2020/0259753 A1  Aug. 13, 2020

Related U.S. Application Data

(63) Continuation of application No. 16/128,016, filed on Sep. 11, 2018, now Pat. No. 10,673,765.

(51) Int. Cl.
| | |
|---|---|
| *H04L 12/851* | (2013.01) |
| *H04L 12/715* | (2013.01) |
| *H04L 12/26* | (2006.01) |
| *H04L 12/46* | (2006.01) |
| *G06N 5/04* | (2006.01) |
| *H04L 12/933* | (2013.01) |

(52) U.S. Cl.
CPC .......... *H04L 47/2441* (2013.01); *G06N 5/04* (2013.01); *H04L 12/4641* (2013.01); *H04L 43/16* (2013.01); *H04L 45/64* (2013.01); *H04L 49/1523* (2013.01)

(58) Field of Classification Search
CPC . H04L 47/2441; H04L 45/64; H04L 49/1523; H04L 12/4641
See application file for complete search history.

(56) References Cited

U.S. PATENT DOCUMENTS

| | | | | |
|---|---|---|---|---|
| 6,442,561 B1 * | 8/2002 | Gehrke | ............. | G06F 16/35 |
| | | | | 707/776 |
| 10,250,489 B2 | 4/2019 | Kadosh et al. | | |
| 2009/0125528 A1 | 5/2009 | Choi | | |

(Continued)

FOREIGN PATENT DOCUMENTS

CN  105516020 A  4/2016

OTHER PUBLICATIONS

Cisco, "Cisco Data Center Spine- and-Leaf Architecture: Design Overview White Paper", Apr. 15, 2016, 25 pages.

(Continued)

*Primary Examiner* — Rasheed Gidado
(74) *Attorney, Agent, or Firm* — Lee & Hayes, P.C.

(57) ABSTRACT

Techniques for generating a multi-layer network topology on a managed network are described herein. An example method includes receiving, from an internetworking device in a network, one or more encrypted packets in a flow; generating a classification decision corresponding to the flow by traversing one or more decision trees; and providing the classification decision to a controller of the network.

18 Claims, 6 Drawing Sheets

(56) References Cited

U.S. PATENT DOCUMENTS

| | | | |
|---|---|---|---|
| 2011/0307423 A1* | 12/2011 | Shotton | G06N 5/003 |
| | | | 706/12 |
| 2013/0091352 A1* | 4/2013 | Patel | H04L 63/0823 |
| | | | 713/156 |
| 2015/0019471 A1 | 1/2015 | Hu et al. | |
| 2016/0205044 A1* | 7/2016 | Tripathi | H04L 45/7457 |
| | | | 370/355 |
| 2016/0269511 A1 | 9/2016 | Guo et al. | |
| 2017/0288945 A1 | 10/2017 | Chandangoudar | |
| 2017/0364702 A1* | 12/2017 | Goldfarb | H04L 63/14 |
| 2017/0364794 A1 | 12/2017 | Mahkonen et al. | |
| 2018/0152386 A1* | 5/2018 | Chen | H04L 47/2441 |
| 2018/0316613 A1 | 11/2018 | Gafni et al. | |
| 2019/0253345 A1 | 8/2019 | Levy et al. | |

OTHER PUBLICATIONS

Mestres, Albert, "Knowledge-Defined Networking: A Machine Learning Based Approach for Network and Traffic Modeling", Sep. 28, 2017, 108 pages.

Office Action for U.S. Appl. No. 16/128,016, dated Oct. 16, 2019, Ma, "Packet Flow Classification in Spine-Leaf Networks Using Machine Learning Based Overlay Distributed Decision Trees", 10 pages.

* cited by examiner

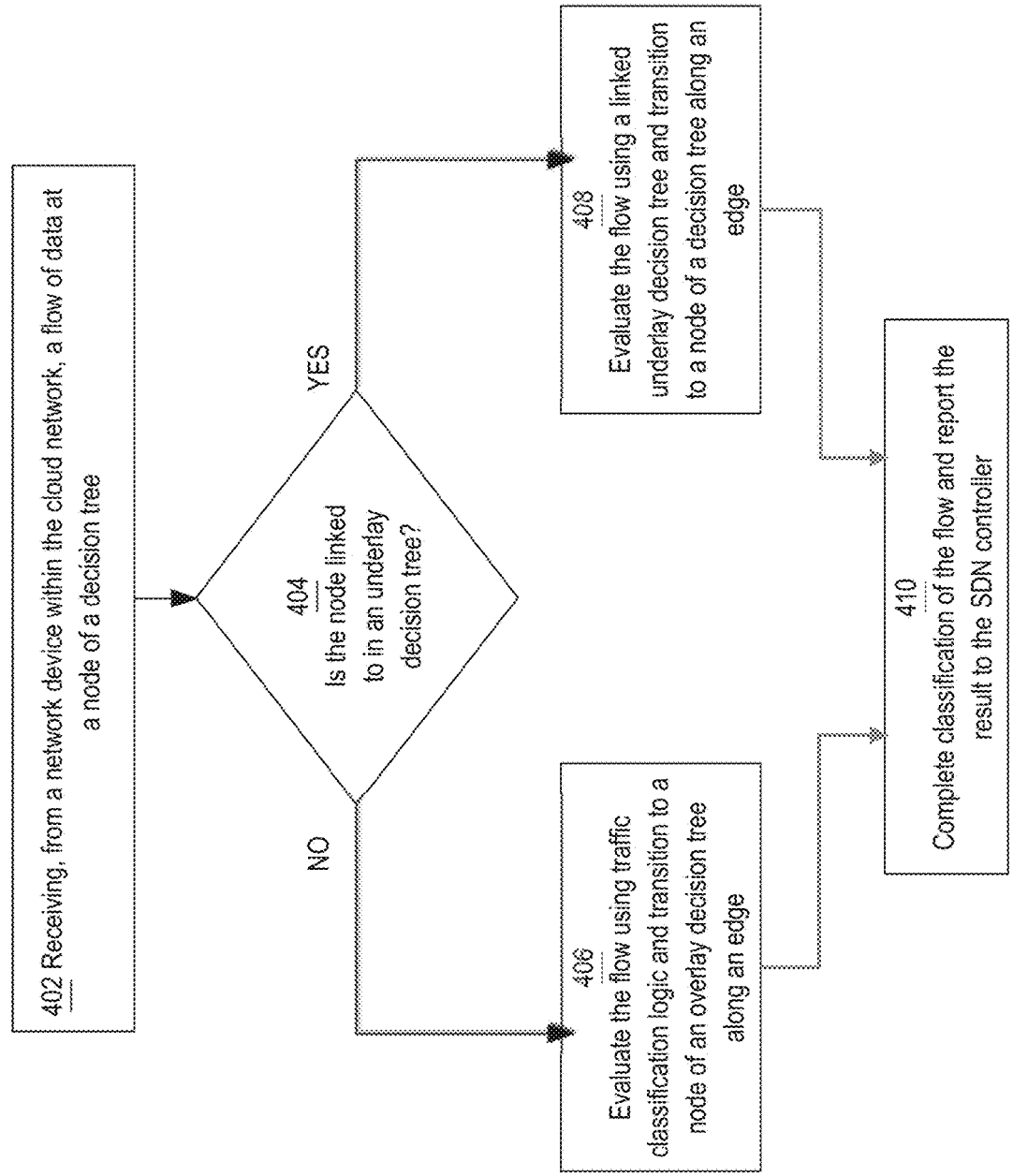

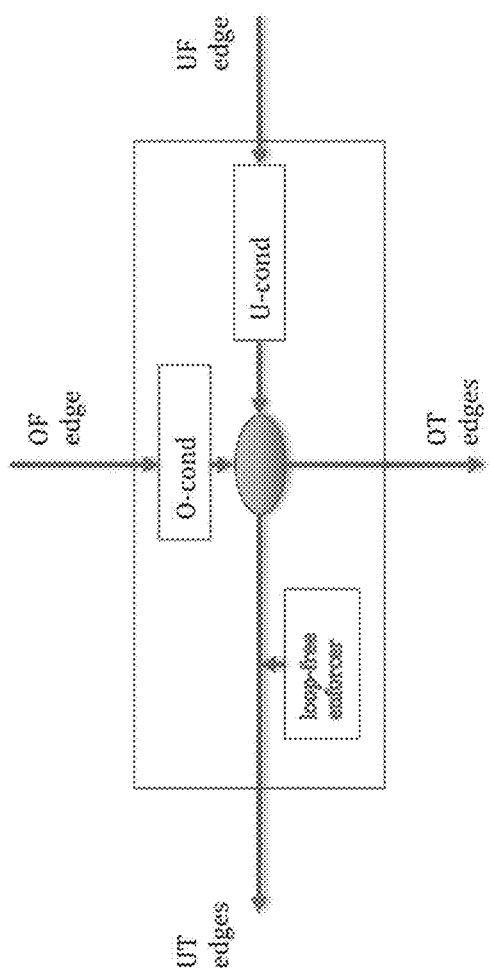
Fig. 4B
Fig. 4C
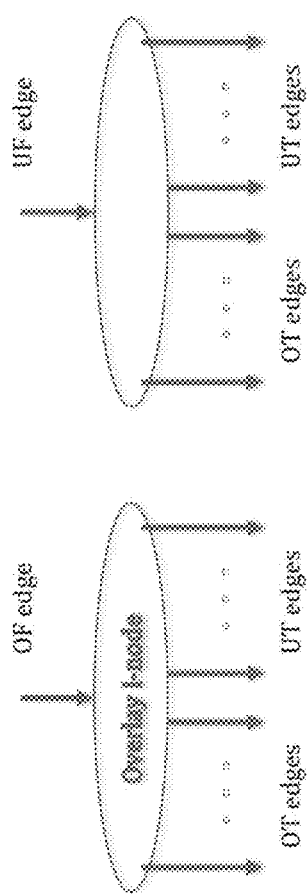
Fig. 4D
| input | $(0, a_0)$ | $(a_0, a_1)$, | $(a_1, a_2)$ | $(a_2, 1)$ |
|---|---|---|---|---|
| egress edges | $UT_0$ | $UT_0$ & $UT_1$ | $UT_1$ | OT |

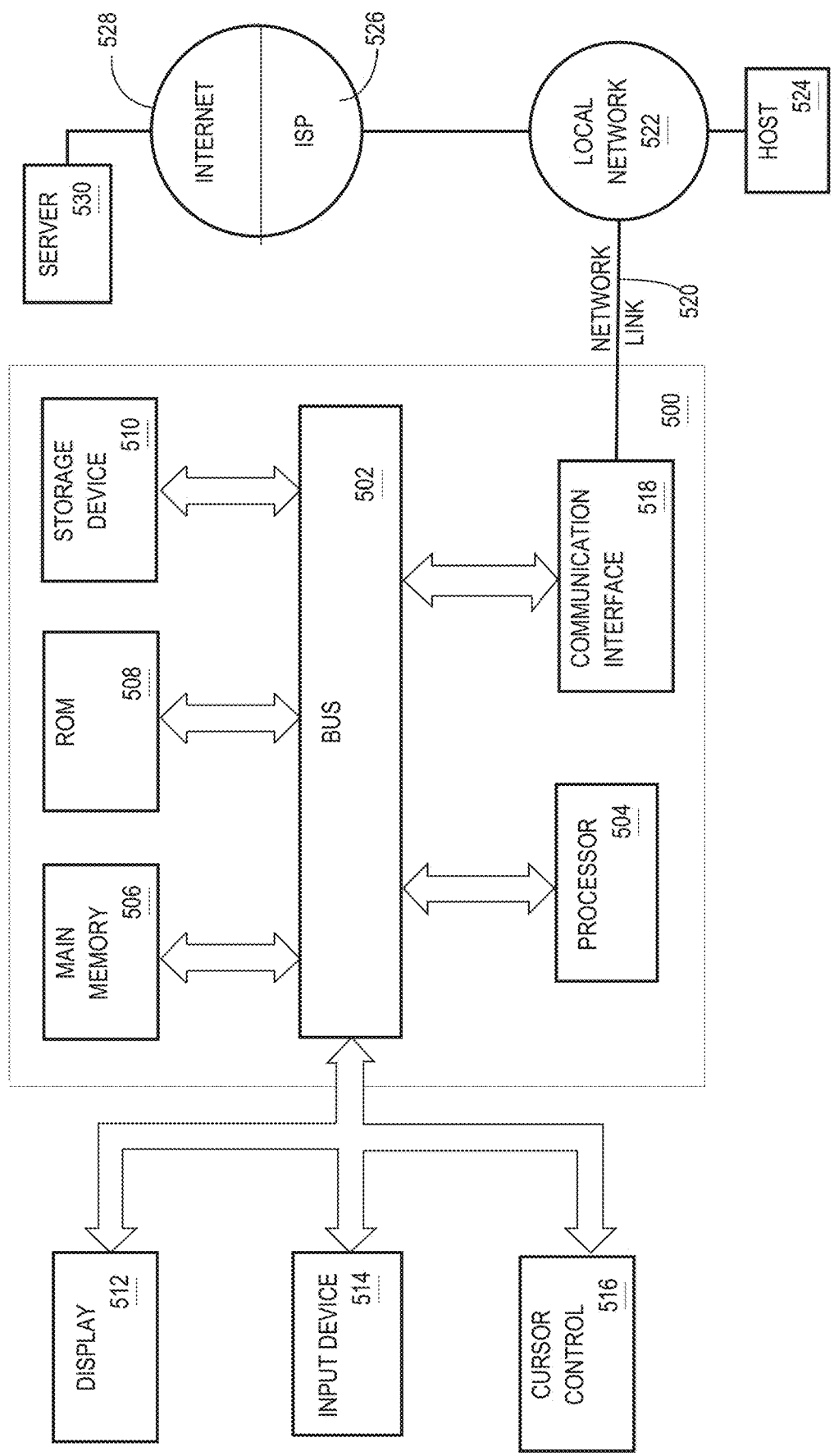

PACKET FLOW CLASSIFICATION IN SPINE-LEAF NETWORKS USING MACHINE LEARNING BASED OVERLAY DISTRIBUTED DECISION TREES

CROSS-REFERENCE TO RELATED APPLICATION

This application is a continuation of, and claims priority to, U.S. application Ser. No. 16/128,016, filed on Sep. 11, 2018, which is fully incorporated by reference herein.

FIELD OF THE DISCLOSURE

One technical field of the present disclosure is classification of packet flows in packet-switched networks. Another technical field is classifying packet flows in which at least a portion of all packets in the flows is encrypted.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Single-cloud or multi-cloud data centers may be implemented using switching devices and routing devices and a software-defined network (SDN) controller that provisions the devices to support data flows between devices. The SDN controller operates as the brain of the network and is programmed to federate control among multiple SDN controller domains using common application interfaces.

In these data centers and cloud networks, traffic volume is constantly growing, resulting in an increase of encrypted data flows found in a network. Machine learning and data analysis tools may be used to classify data-flows, but maintaining throughput in real time is a challenge. The Decision Tree (DT) is a machine learning and statistics data analysis tool that can be constructed through a supervised learning process on pre-collected training data and used for analytical classification in data center and cloud environments. Additionally, DTs are used for decision analysis pertaining to data to assist in identifying a strategy most likely to reach a specific goal in a network. However, current DT implementations suffer from performance scaling issues as they have been limited to running on one host device, but the number of network devices allowed within a given network fabric is constantly growing. Furthermore, the speed and volume of data traffic flows through the network devices are also constantly growing.

Thus, there is a need for a system that allows for more efficient and accurate classification of data flows and applies the use of DT evaluations utilizing network topology and flow routing information in a cloud data center.

SUMMARY

The appended claims may serve to summarize the disclosure.

BRIEF DESCRIPTION OF THE DRAWINGS

In the drawings:

FIG. 4A illustrates an approach for classifying packets using a multi-layered decision tree in accordance with an embodiment.

FIG. 4B illustrates an example of a node with four (4) edges denoted OF, UF, OT, UT.

FIG. 4C is a two-part diagram that schematically illustrates, in a left portion, decision flows originating on an OF edge.

FIG. 4D illustrates an example of underlay conditions that may be programmed an overlay decision tree node N.

FIG. 5 is a block diagram that illustrates an example computer system with which an embodiment may be implemented.

DETAILED DESCRIPTION

Figure 1:
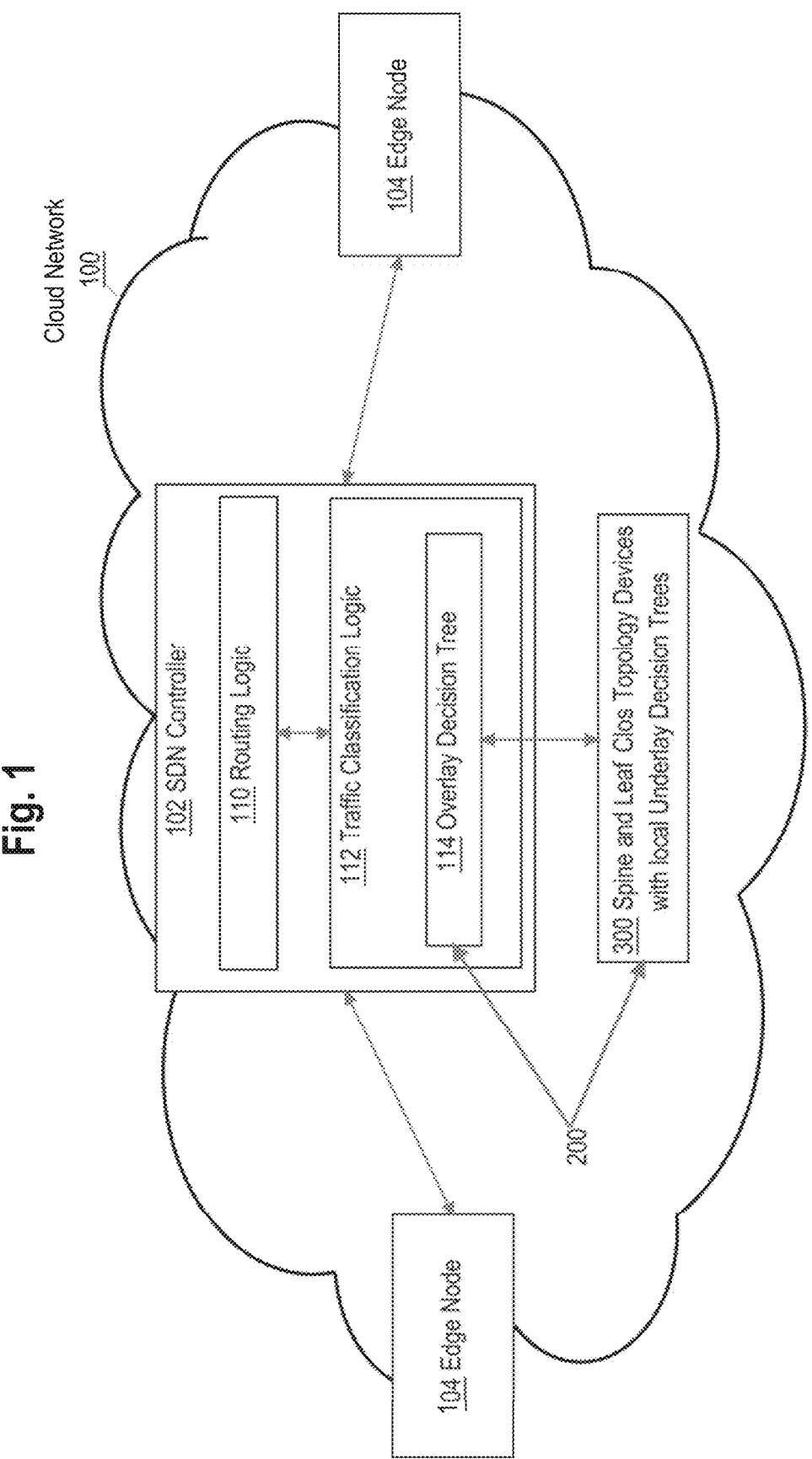
FIG. 1 illustrates a hypothetical example cloud network in which a network controller hosts traffic classification logic that executes an overlay decision tree that is linked to underlay decision trees.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments. Embodiments are described in sections below according to the following outline:

1. General Overview
2. Structural Overview
3. Functional Overview
4. Benefits of Certain Embodiments
5. Implementation Example—Hardware Overview

1. General Overview

Techniques for generating a multi-layer network topology on a managed network are described herein. In some embodiments, network topology and flow routing information is used to classify traffic flows across network devices in parallel and by executing optimized decision trees. In one embodiment, the disclosure encompasses decision trees that are capable of utilizing the computing power and networking knowledge of the data center network fabric. The disclosed approaches permit more efficient and accurate classification of data flows in cloud data centers and other contexts.

In an embodiment, computer-implemented systems and methods comprise creating and storing a two-layer decision tree comprising an underlay decision tree layer comprising a plurality of decision trees, in which each of the decision trees in the plurality of decision trees is associated with one of a leaf switch, a spine switch, or a controller in a network; an overlay decision tree comprising a plurality of nodes, each of the nodes can be associated with one of the decision trees in the plurality of decision trees; a logic node that communicatively couples the underlay decision tree layer to the overlay decision tree, the logic node implemented at the controller; receiving a packet flow from an internetworking device in the network; classifying the packet flow by traversing the overlay decision tree and, from one or more of the nodes in the overlay decision tree, traversing one or more of the decision trees in the plurality of decision trees, and reaching a classification decision at a first leaf node of the overlay decision tree; and transmitting the classification decision to the controller.

In an embodiment, the classifying further comprises classifying the packet flow by traversing the overlay decision tree and at each particular node of the overlay decision tree, initiating traversal of a particular decision tree among the plurality of decision trees, in the underlay decision tree layer, that is associated with the particular node; and at a second leaf node of the particular decision tree, performing a further classification decision and returning to traversing the overlay decision tree.

In one feature, the method further comprises executing the traversal of a plurality of different decision trees, among the plurality of decision trees, in the underlay decision tree layer, via parallel processing. In some embodiments, the method further comprises executing the traversal of a plurality of different decision trees, among the plurality of decision trees, in the underlay decision tree layer, via parallel processing at each of the leaf switch, spine switch or controller that is respectively associated with the different decision trees.

In some embodiments, the method further comprises, as part of traversing the overlay decision tree, for a particular node among the nodes of the overlay decision tree: in response to traversing to the particular node from a parent node in the overlay decision tree, evaluating an overlay condition and transitioning either to one of the decision trees in the underlay decision tree or to another node of the overlay decision tree based upon a result of evaluating the overlay condition; and in response to traversing to the particular node from one of the decision trees in the underlay decision tree, evaluating a underlay condition and transitioning either to one of the decision trees in the underlay decision tree or to another node of the overlay decision tree based upon a result of evaluating the underlay condition, wherein each of the overlay condition and the underlay condition represent a packet flow classification test.

In one feature, each of the overlay condition and the underlay condition represent different sequentially ordered packet flow classification tests. Another feature comprises: in response to an evaluation of conditions that cause transitioning to one of the decision trees in the underlay decision tree layer, performing the transitioning only when that one of the decision trees was not previously visited. Still another feature comprises: associating at least one threshold value, and a set of value decision rules that specify transition types and corresponding parameter values, with the underlay condition; comparing a parameter of the packet flow to the threshold value, and selecting one of the transition types; and transitioning either to one of the decision trees in the underlay decision tree, or to another node of the overlay decision tree based upon the comparing and the value decision rules.

In one feature, the method further comprises creating and storing a plurality of virtual overlay links that respectively connect each of the decision trees in the plurality of decision trees to the nodes. In another feature, the overlay decision tree is implemented in Virtual Extensible Local Area Network (VXLAN) and each of the virtual overlay links is created using a unique VXLAN identifier. In another embodiment, the network is a spine and leaf Clos topology network.

In an embodiment, the method further comprises determining that an endpoint group (EPG) is deployed on two leaf switches in the network that are associated respectively with a first particular classification decision tree and with a second particular classification decision tree of the underlay decision tree layer; and in response to the determining, obtaining a first classification decision from the first particular classification tree, obtaining a second classification tree from the second particular classification tree, and selecting from among the first classification decision and the second classification decision using a particular node of the overlay decision tree.

In another embodiment, the method further comprises querying a network controller to request a status of the EPG; determining, based on a response to the querying, that the EPG is not deployed on a particular leaf switch of the network; and in response to the determining step, pruning a particular decision tree of the underlay decision tree layer that corresponds to the particular leaf switch.

Other embodiments may be implemented as one or more non-transitory computer-readable storage media storing one or more sequences of instructions which, when executed using one or more processors, cause the one or more processors to perform the steps that are expressed in any of the foregoing clauses.

In an embodiment, data flows may be received from network devices in a network and analyzed using a multi-layered plurality of decision trees that are created and managed in computer memory using programmatic objects or other programmed constructs. Each of the decision trees comprises a plurality of different types of nodes as well as one overlay decision tree, and at least one underlay decision tree. The nodes include a set of logic nodes on the overlay tree that communicatively couples at least one of the underlay trees to at least one of the logic nodes on the overlay tree. The received data is then classified by the plurality of decision trees according to programmed logic that causes classification decisions to propagate among the nodes and trees in a specified manner.

In one embodiment, each overlay decision tree includes a first plurality of decision trees and a plurality of logic nodes, and each underlay decision tree includes a second plurality of decision trees and a plurality of nodes. The overlay decision tree and the underlay decision tree connect via a logic node, forming a logical multi-layered decision tree. The nodes of the overlay tree and the underlay tree include at least one node connected to or representing a leaf switch, and at least one node connected to or representing a spine switch. Network devices, which are associated with the nodes that are connected to the respective leaf switch and spine switch, are configured to independently evaluate their respective portion of the multi-layered decision tree.

In one embodiment, each network device within the network is associated with a leaf node or spine node, from among the plurality of nodes of an underlay tree. An SDN controller receives and data flows from network devices of the managed network and classifies the flows using an underlay decision tree. A classification is based on determining a value range containing an upper bound associated with a first decision tree and a lower bound associated with a second decision tree that is different from the first. If the value falls between the upper bound and the lower bound, then a classification is made based on a median within the values achieved from both decision trees.

Thus, a two-layer decision tree may be constructed and evaluated based on spine and leaf data center fabric topology; optimization techniques such as boosting, pruning and soft thresholding may be applied on links connecting the two-layer decision tree nodes, to perform decision tree-based classification more efficiently and accurately.

In one embodiment, each decision tree within the plurality of decision trees is trained using training set data that has been received from network devices in a managed network.

2. Structural Overview

Figure 2:
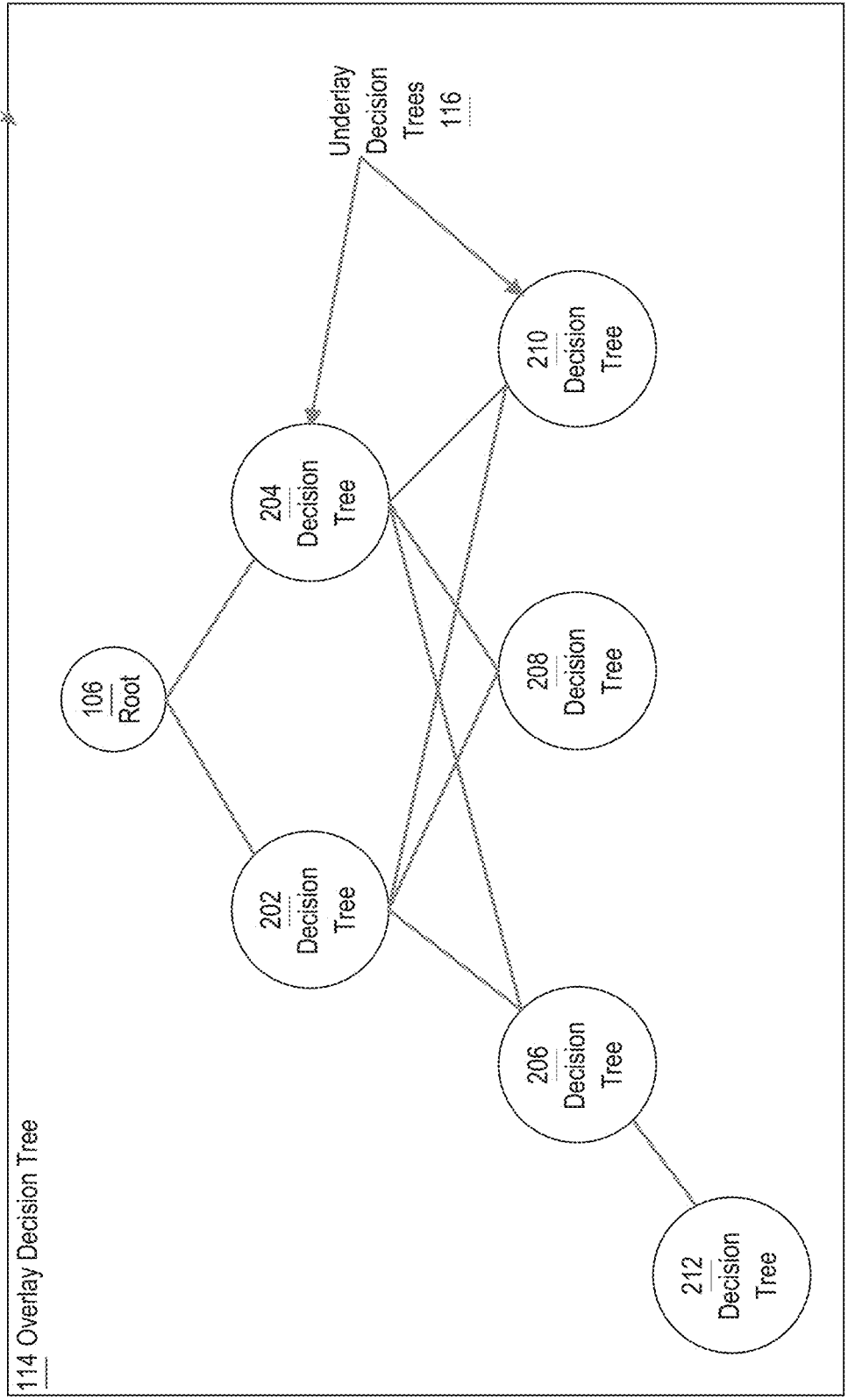
FIG. 2 illustrates an example multi-layered decision tree comprising an overlay decision tree that is linked to underlay decision trees at nodes representing devices in a spine and leaf Clos network topology.
Figure 3:
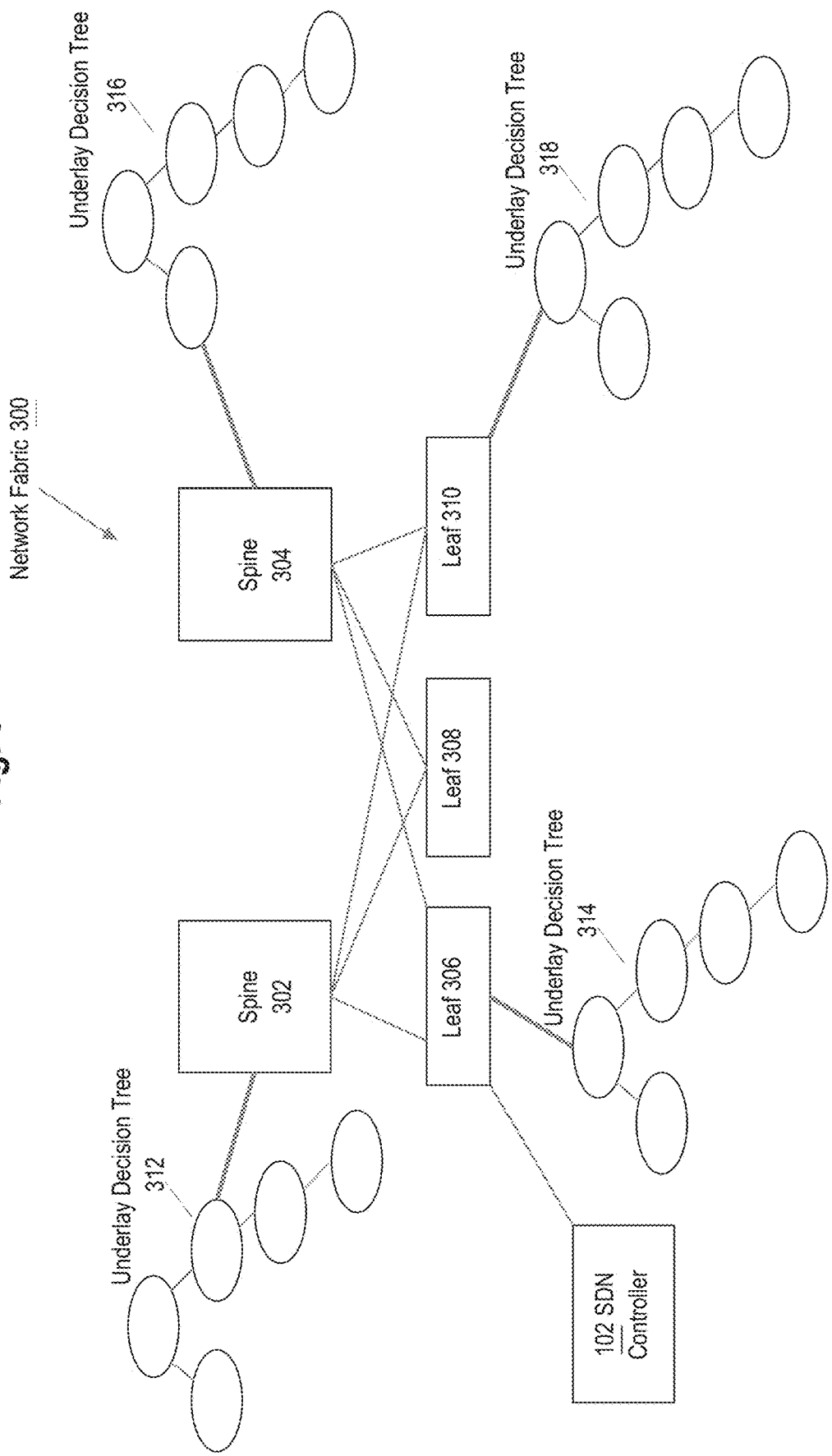
FIG. 3 illustrates an example spine and leaf Clos network fabric comprising internetworking devices such as spine switches and leaf switches each hosting a local underlay decision tree.

FIG. 1, FIG. 2, and FIG. 3 illustrate examples of structural arrangements and functions that can be used in some implementations. Each of FIG. 1, FIG. 2, FIG. 3 illustrates a hypothetical network arrangement and is provided for purposes of illustrating clear examples; however, other embodiments of the techniques that are described in this disclosure as a whole may use specific networking implementations with different numbers of devices as well as variations of arrangements of devices, nodes or trees that are functionally equivalent but different than shown in the drawing figures.

FIG. 1 illustrates a hypothetical example cloud network in which a network controller hosts traffic classification logic that executes an overlay decision tree that is linked to underlay decision trees. In the example of FIG. 1, a cloud network 100 comprises SDN controller 102 coupled to a plurality of edge nodes 104 and to devices in a spine and leaf Clos network topology that host local underlay decision trees. Cloud network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links.

Software-defined networking (SDN) controller 102 and other elements of the system may each comprise a special-purpose computer having an interface compatible with cloud network 100 and are programmed or configured to use standardized protocols for communication across the networks such as TCP/IP, Bluetooth, and higher-layer protocols such as HTTP, TLS, and the like. FIG. 1 depicts cloud network 100 and SDN controller 102 as distinct elements for the purpose of illustrating a clear example. However, in other embodiments, more or fewer computers may accomplish the functions described herein. For example, the cloud network and the SDN controller may comprise applications executing on a single server computer. Additionally or alternatively, cloud network 100 may include multiple virtual servers stored on one or more devices and/or separate server computers.

Each of the edge nodes 104 may comprise internetworking devices such as routers, switches or other network infrastructure elements.

In an embodiment, SDN controller 102 hosts routing logic 110 and traffic classification logic 112 that implements an overlay decision tree 114 and is coupled to underlay decision trees in network fabric 300, as will be further described. Collectively, overlay decision tree 114 and the underlay decision trees hosted in devices of network fabric 300 form a multi-layered decision tree 200. In an embodiment, SDN controller 102 comprises a computer system that is programmed in part to manage, classify, apply policy to, and generate reports about packet flows between switches and routers. The SDN controller 102 may be implemented as a computer program application that is executed using a computer, virtual computing system or as part of an orchestration system. The SDN controller 102 may communicate with networked devices using application programming interfaces (API). The SDN controller 102 may perform a variety of network tasks, such as identifying which devices are in the network, the capabilities of the devices, gathering network statistics, and/or executing rules to determine optimal allocation of resources throughout the network. The SDN controller 102 may be further programmed or configured to receive the results of data flow evaluations and classifications switches and/or routers.

FIG. 2 illustrates an example multi-layered decision tree comprising an overlay decision tree that is linked to underlay decision trees at nodes representing devices in a spine and leaf Clos network topology. In the field of telecommunications, a Clos network is a multistage circuit switching network formalized by Charles Clos in the 1950s and which represents a theoretical idealization of practical multistage switching systems. Spine and leaf Clos topology with an SDN controller may be used in data center or cloud networking environments.

In an embodiment, decision trees are integrated with this topology to construct two-layer, distributed decision trees over the networking fabric and controller in the cloud. In an underlay layer, each leaf, spine or controller is associated with an individual decision tree, and logically above that layer, an overlay decision tree is provided with each node representing the underlying local decision tree on a device such as leaf switch, spine switch or controller. Therefore, the overlay decision tree links all underlay decision trees together, forming a logical two-layer decision tree with each node executing a section of the full logical decision tree.

With this architecture, a logical decision tree can be constructed and evaluated in distributed and layered fashion. The root of the overlay decision tree and the logical decision tree may be at the controller, and final classification may be reached at leaf nodes. Virtual overlay links may connect these otherwise separated sections of the local decision trees to form the full logical decision tree. For example, if a VXLAN overlay is used, the virtual overlay links may use unique VXLAN identifiers selected from among reserved VXLAN identifiers or VNIs in order to create the overlay decision tree connecting the plurality of local decision trees. Each underlay decision tree may use parameters that can be evaluated locally on the device such as spine switch, leaf switch or controller. Therefore, all local decision trees can be evaluated in parallel. This approach permits fully utilizing available computing resources in cloud computing centers as well as reducing inter-device traffic and bandwidth consumption.

In one embodiment, the Cisco ACI architecture from Cisco Systems, Inc., San Jose, Calif. is used and the spine decision tree is constructed using data in an Oracle database that is maintained on spine nodes; leaf decision trees are constructed using parameters relating to access interfaces; and a controller's decision tree is constructed with parameters related to user configuration in a logical network model. Therefore, each device can evaluate its portion of the logical tree independently. When a local decision tree reaches a local leaf node, traversal triggers the corresponding node evaluation logic, and starts evaluating the overlay decision tree. When the overlay decision tree reaches its leaf node, traversal triggers the corresponding underlay decision tree on the controller. On the overlay decision tree, traversal across devices occurs over the virtual overlay link with its own VNI, and eventually reaches the leaf node of the logical decision free to determine a final classification result.

In the example of FIG. 2, a multi-layered decision tree 200 comprises an overlay decision tree 114 having a root node 106 and a plurality of decision tree nodes 202, 204, 206, 208, 210, 212. Each of the decision tree nodes 202, 204, 206, 208, 210, 212 represents an internetworking device or controller in a physical network, such as in network fabric 300 of FIG. 3, and each hosts or executes a local underlay decision tree 116. With this arrangement, the overlay decision tree 114 has an arrangement of nodes that corresponds to the actual interconnections of physical devices in the network fabric 300. Root node 106 serves to connect or integrate the underlay decision trees 116 with overlay decision tree 114 to form a logical multi-layered decision tree capable of classifying data flows of cloud network 100. Furthermore, in operation, traversal of the overlay decision tree 114 from root node 106 to one of the decision tree nodes 202, 204, 206, 208, 210, 212 is programmed to cause a request to locally execute the underlay decision tree 116 at that particular decision tree node 202, 204, 206, 208, 210, 212; in this manner, the present approach can use computer processing resources that are available in the internetworking nodes of the network fabric 300 rather than relying on centralized execution of all decision trees to accomplish packet flow classification.

In the example architecture, root node 106 and the decision tree nodes 202, 204, 206, 208, 210, 212 of overlay decision tree 114 form a first layer of a multi-layered decision tree 200. Underlay decision trees 116 at each of decision tree nodes 202, 204, 206, 208, 210, 212 form a second layer of the multi-layered decision tree 200. Overlay decision tree 114 links decision trees 116 of decision tree nodes 202, 204, 206, 208, 210, 212, allowing multi-layered decision tree 200 to be evaluated in distributed fashion.

In other embodiments, more or fewer decision trees may accomplish the functions described herein. For example, root node 106 may be the only node necessary to form the first layer of multi-layered decision tree 200 and there may be a single decision tree 116 in the second layer of multi-layered decision tree 200.

In one embodiment, root node 106 represents, the overlay decision tree 114 is hosted and executed at, at SDN controller 102, but this is not a strict requirement and other embodiments may implement other approaches for hosting and executing the overlay decision tree. Furthermore, embodiments may implement failover techniques in which SDN controller 102 acts as a primary packet flow classification node and other nodes in network 100 are programmed as standby packet flow classification nodes.

3. Functional Overview

FIG. 3 illustrates an example spine and leaf Clos network fabric comprising internetworking devices such as spine switches and leaf switches each hosting a local underlay decision tree. In the example of FIG. 3, a network fabric 300 comprises spine nodes 302, 304 coupled to leaf nodes 306, 308, 310; the leaf node 306 is coupled to SDN controller 102 in this example. Lines indicate communication links between spine nodes 302, 304 and leaf nodes 306, 308, 310 that define a Clos topology. Spine nodes 302, 304 may comprise spine packet switches. Leaf nodes 306, 308, 310 may comprise any of switches, routers, and/or endpoint devices such as computers, printers or other digital computing devices.

Each of the spine nodes 302, 304 and leaf nodes 306, 308, 310 hosts or executes a different underlay decision tree 312, 314, 316, 318. In some embodiments, each of the spine nodes 302, 304 and leaf nodes 306, 308, 310 hosts or executes traffic classification logic 112 to perform packet flow classification. In other embodiments, packet flow classification may occur only at each leaf node within the spine and leaf CLOS topology.

Each of the underlay decision trees 312, 314, 316, 318 is programmed to use parameters of network packet flows and to execute or evaluate locally on the SDN controller 102, spine nodes 302, 304, or leaf nodes 306, 308, 310. In one embodiment, underlay decision tree 314 is constructed with parameters related to user configuration provided to SDN controller 102, and underlay decision trees 312 and 316 of spine nodes 302 and 304 respectively are constructed with data parameters maintained on network devices associated with spine nodes 302 and 304 allowing each network device to evaluate its portion of multi-layered decision tree 200 independently.

FIG. 4A illustrates an approach for classifying packets using a multi-layered decision tree in accordance with an embodiment. FIG. 4A illustrates an approach that may be programmed as part of traffic classification logic 112 of SDN controller 102 (FIG. 1) to perform packet flow classification using both overlay decision tree 114 and invocation of local packet classification at underlay decision trees 116 hosted in nodes of the network fabric 300, thus using the multi-layered decision tree 200 to accomplish packet flow classification.

The process of FIG. 4A may be implemented using computer executable instructions in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. The drawing figures may represent the manner in which programmers or software developers organize and arrange source code for later compilation into an executable, or interpretation into bytecode or the equivalent, for execution by the systems described herein.

In step 402, a flow of packet data is received from a network device. For example, SDN controller 102 receives a flow from edge devices 104 (FIG. 1) or from any of the spine nodes 302, 304, or leaf nodes 306, 308, 310 of network fabric 300 (FIG. 3). The process then begins traversal of overlay decision tree 114 at root node 106 (FIG. 2) until traversal reaches a node 202, 204, 206, 208, 210 that represents the device that was the source of the packet data flow.

In step 404, routing logic 110 determines whether traversal has a reached a node of overlay decision tree 114 that is linked to an underlay decision tree 116. If the node of overlay decision tree 114 is not linked, then control passes to step 406 in which the flow of data is evaluated via traffic classification logic 112 and a node of overlay decision tree 114 is entered into along edge node 104 via routing logic 110. If the node is linked to an underlay decision tree 116, then control passes to step 408 in which the flow of data is evaluated via traffic classification logic 112 locally at a device of the network fabric using the underlay decision tree 116 and thereafter and a node of either overlay decision tree 114 or underlay decision 116 is entered into along edge node 104 via routing logic 110. This selective traversal process is now further explained.

Each node of overlay decision tree 114 has four (4) types of edges. FIG. 4B illustrates an example of a node with four (4) edges denoted OF, UF, OT, UT. In an embodiment, an overlay from edge (OF) enters the node of an overlay decision tree from its parent node in the overlay decision tree. An underlay to edge (UT) connects the node of an overlay decision tree to a root node of an underlay decision tree. An overlay to edge (OT) connects the node to a child node of an overlay decision tree. An underlay from edge (UF) enters the node from a leaf node of underlay tree of an underlay decision tree.

In one embodiment, each node in overlay decision tree 114 and underlay decision tree 116 is evaluated according to conditions known as overlay-conditions and underlay-conditions, which are respectively abbreviated as O-cond and U-cond in FIG. 4B. As described herein, overlay-conditions and underlay-conditions each comprise factors and threshold values for evaluation against overlay and underlay decision trees to determine whether the trees satisfy the factors and threshold values. For example, when decision logic associated with an overlay decision tree 114 evaluates a flow and enters a node of overlay decision tree 114 along an edge node 104 of the OF type, the decision logic evaluates the overlay-conditions and based on the evaluation result a classification path either leaves the node along an edge node 104 of the UT type to go to a node of underlay decision tree 116, or leaves the current node of overlay decision tree 114 to go to another node of overlay decision tree 114. FIG. 4C is a two-part diagram that schematically illustrates, in a left portion, decision flows originating on an OF edge. In some embodiments, each overlay condition or underlay condition may represent a different packet flow classification test. Packet flow classification tests may classify packets into flows based on values of IP header attributes such as source address, destination address, source port, destination port; based on label values such as MPLS labels; packet size or length; protocol identifier; rate, burstiness or other statistical values; NBAR attributes such as application identifiers or port assignments; known patterns of bits or values that are signatures of various applications; or intra-protocol attributes.

When decision logic of underlay decision tree 116 evaluates a data flow and enters a node of overlay decision tree along an edge node 104 of the UF type, the decision logic will evaluate the underlay-conditions and based on the evaluation result it will either leave the node of overlay decision tree 114 along an edge node 104 of the OT type to go to another node of overlay decision tree 116 or leave the node of overlay decision tree 114 along an edge node 104 of the UT type to go to another node of underlay decision tree 114. FIG. 4C also schematically illustrates decision flows originating on an UF edge, in a right portion of FIG. 4C.

In one embodiment, the decision logic of overlay decision tree 114 will evaluate the conditions of overlay decision tree 114 and based on the evaluation result it will leave the node of overlay decision tree 114 along an edge node 104 of the UT type to go to multiple underlay decision trees allowing sequential evaluations of the underlay decision trees to be specified in a certain order. For example, certain classification may be needed on a spine network device first, and based on the result, other classification can be performed on a leaf network device; regular decision trees cannot specify this form of sequential subtree evaluation sequence.

However, such sequential evaluation could introduce recursive evaluation of underlying decision trees. Therefore, in an embodiment, decision logic of overlay decision tree 114 is enhanced with loop-free enforcer code to prevent loops or recursive evaluations, as seen in FIG. 4B. In one approach, with each internal node of an overlay decision tree, for each flow, a bitmap of all connected underlay decision trees is maintained; each time tree traversal reaches an underlay decision tree along a UT edge, the decision logic first checks whether the bit corresponding to that underlay decision tree is TRUE. If the bit is FALSE, it is set to TRUE and then the underlay decision tree is traversed. This approach is effective to prevent loops in overlay decision tree evaluation.

Referring again to FIG. 4A, in step 410, the flow of data is classified via traffic classification logic 112 and the result may be reported back to SDN controller 102. The classification is made on the data flows via traffic classification logic 112 based on a range containing an upper bound associated with a first decision tree within underlay decision tree 116, a median associated with a second decision tree within underlay decision tree 116, and a lower bound associated with a third decision tree within underlay decision tree 116. Upon classification, a value within the range is determined and the respective decision tree is entered into based upon where the value falls within the range.

In one embodiment, the root node of overlay decision tree 114 resides in SDN controller 102, the root of multi-layered decision tree 200 is the root node of overlay decision tree 114, and the leaf nodes of multi-layered decision tree 200 are the leaf nodes of overlay decision tree 114. The overlay decision tree has only OF edges, so once it is reached, packet flow classification may terminate and results may be reported to the SDN controller where the overlay decision tree root node resides.

With this approach, the root node of the logical decision tree is essentially the root node of the overlay decision tree, and the leaf nodes of the logical decision tree are the leaf nodes of the overlay decision tree.

In one embodiment, each decision tree within multi-layered decision tree 200 is trained using supervised learning with a training data set received from a network device within cloud network 100. For example, each decision tree running a spine or leaf node within cloud network 100 will have a separate training set allowing the trees to operated independently from each other. After training, the decision trees can be used for analytical classification in the manner that has been described, for data centers or cloud environments.

Such a two-layer logical decision tree over spine-leaf and controller network infrastructure is more expressive and more powerful than conventional DTs that do not make full use of all the networking, computing and storage resources in data center and cloud environment. Furthermore, network topology specific improvements may be achieved, such as intelligent adaptive boosting on the set of underlay decision trees. For example, in Cisco's Application Centric Infrastructure (ACI), if an endpoint group (EPG) is deployed on two leaf switches, in analytical classification related to this EPG, intelligent boosting can be applied to the corresponding overlay node which connects to two independent underlay decision trees running on these two leaf switches in parallel. Each underlay decision tree will generate a predicted class and an overlay node will determine the final class. The expressiveness and powerfulness of this two-layer DT also lie in the logic node of the overlay DT that enables traversing down to a set of underlay DTs finite numbers of times in predefined order, which is not possible in conventional DTs.

Furthermore, intelligent pruning of underlay decision trees may be implemented at the overlay decision tree level. With the same example as above, the ACI APIC controller can be queried to determine that a certain EPG is not deployed on a leaf switch. In response, the corresponding underlay decision tree may be pruned or deleted.

Soft-thresholding on overlay decision tree internal nodes also can be implemented resulting in transitions of the types described herein based on whether the threshold value is satisfied. For example, an overlay decision tree node N may be programmed with underlay conditions as shown in FIG. 4D. In this example, transition types for three (3) soft-thresholds $a_0$, $a_1$ and $a_2$ are defined for a parameter of the flow. Decision logic of the node is programmed to perform a packet classification test when the parameter (between 0 and 1) is less than the threshold value, and in response, to cause traversal down to the first underlay decision tree. The decision logic is further programmed to determine when the parameter is less than but no less than the threshold, and in response, to execute both the underlay decision tree for adaptive boosting. The threshold value may be compared to the parameter and a specific transition or traversal of the overlay decision tree may occur based on the result of the comparison.

The decision logic is further programmed to determine when the parameter is less than but no less than the threshold, and in response, to traverse down to the second underlay decision tree. The decision logic is further programmed to determine when the parameter is greater than $a_2$, and in response, to go directly to a child node of an overlay decision tree.

4. Benefits of Certain Embodiments

The systems and methods herein provide improvements to classification of data flows in data center and cloud networks. By using a multi-layered network topology, the system is able to use multiple decision trees to utilize the underlying resources and network infrastructure in parallel and also allow each network device within a cloud network to evaluate its respective portion of a logical decision tree independently. Furthermore, the underlying network topology and flow routing information can be used to classify traffic flows and apply appropriate policies. The systems and methods described herein improve the functioning of the computing systems by efficiently and accurately classifying data flows and can do so in some embodiments in real time or near real time.

5. Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 404 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 430 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
receiving, from an internetworking device in a network, one or more encrypted packets in a flow;
generating a classification decision corresponding to the flow by traversing one or more decision trees; and
providing the classification decision to a controller of the network,
wherein traversing the one or more decision trees comprises:
generating an evaluation result by evaluating, at a node of an overlay decision tree, the flow based at least partly on an overlay condition;
identifying an underlay decision tree linked to the node based on the evaluation result; and
generating the classification decision based at least partly on traversing the underlay decision tree.

2. The method of claim 1, wherein the internetworking device comprises a leaf switch or a spine switch.

3. The method of claim 1, wherein the internetworking device is a first internetworking device, and the method is performed by one or more second internetworking devices in the network.

4. The method of claim 1, wherein traversing the one or more decision trees comprises traversing multiple underlay decision trees comprising the underlay decision tree via parallel processing.

5. The method of claim 1, wherein the underlay decision tree comprises a first underlay decision tree associated with a first switch in the network and the one or more decision trees comprise a second underlay decision tree associated with a second switch in the network, an endpoint group (EPG) being deployed on the first switch and the second switch, and
wherein generating the classification decision comprises:
generating a first classification decision by traversing the first underlay decision tree;
generating a second classification decision by traversing the second underlay decision tree; and
selecting the classification decision among the first classification decision and the second classification decision.

6. The method of claim 5, further comprising:
determining that the EPG is deployed outside of a third switch in the network; and
pruning a third underlay decision tree associated with the third switch from the one or more decision trees.

7. The method of claim 1, wherein the overlay condition comprises a packet flow classification test.

8. A system comprising:
at least one processor; and
memory storing instructions that, when executed by the at least one processor, cause the system to perform operations comprising:
receiving, from an internetworking device in a network, one or more packets in a flow;
classifying the flow by:
traversing an overlay decision tree;
traversing one or more underlay decision trees linked to the overlay decision tree based at least partly on traversing the overlay decision tree; and
reaching a classification decision based at least partly on traversing the overlay decision tree and traversing the one or more underlay decision trees; and
providing the classification decision to a controller,
wherein traversing the overlay decision tree comprises:
generating an evaluation result by evaluating, at a first node of the overlay decision tree, the flow based at least partly on an overlay condition; and
identifying an underlay decision tree among the one or more underlay decision trees based on the evaluation result, and
wherein traversing the one or more underlay decision trees comprises traversing the underlay decision tree.

9. The system of claim 8, wherein the internetworking device comprises a leaf switch, a spine switch, or a controller.

10. The system of claim 8, wherein the internetworking device is a first internetworking device, and the system comprises one or more second internetworking devices in the network.

11. The system of claim 8, wherein traversing the one or more underlay decision trees comprises traversing multiple underlay decision trees via parallel processing.

12. The system of claim 8, wherein the one or more underlay decision trees comprise a first underlay decision tree associated with a first switch in the network and a second underlay decision tree associated with a second switch in the network, an endpoint group (EPG) being deployed on the first switch and the second switch, and
wherein reaching the classification decision comprises:
reaching a first classification decision by traversing the first underlay decision tree;
reaching a second classification decision by traversing the second underlay decision tree; and
selecting the classification decision among the first classification decision and the second classification decision.

13. The system of claim 12, wherein the operations further comprise:
determining that the EPG is deployed outside of a third switch in the network; and
pruning a third underlay decision tree associated with the third switch from the one or more underlay decision trees.

14. The system of claim 1, wherein the overlay condition a packet flow classification test.

15. A system comprising:
at least one processor; and
memory storing:
an overlay decision tree comprising nodes;
instructions that, when executed by the at least one processor, cause the system to perform operations comprising:
receiving, from an internetworking device in a network, one or more packets in an encrypted flow;
classifying the encrypted flow by:
generating a first classification result by evaluating the flow based on a first overlay condition associated with a first node among the nodes;
in response to generating the first classification result, causing a first switch in the network to generate a first classification decision based on one or more first underlay conditions associated with a first underlay decision tree, the first underlay decision tree being linked to the first node;
generating a second classification result by evaluating the flow based on a second overlay condition associated with a second node among the nodes;
in response to generating the second classification result, causing a second switch in the network to generate a second classification decision based on one or more second underlay conditions associated with a second underlay decision tree, the second underlay decision tree being linked to the second node, an endpoint group (EPG) being deployed on the first switch and the second switch; and selecting a classification decision among the first classification decision and the second classification decision; and providing the classification decision to a controller of the network.

16. The system of claim 15, wherein at least one of the first overlay condition, the one or more first underlay conditions, the second overlay condition, or the one or more second underlay conditions comprises at least one packet flow classification test.

17. The system of claim 15, wherein the internetworking device comprises a third switch in the network.

18. The system of claim 15, wherein the system comprises the controller of the network.

* * * * *